United States Patent [19]
Sheikh et al.

[11] Patent Number: 5,512,182
[45] Date of Patent: Apr. 30, 1996

[54] PROCESS FOR REMOVING TRACE AMOUNTS OF AMMONIA-CONTAINING COMPOUNDS FROM AQUEOUS STREAMS

[75] Inventors: Morris Sheikh, Bloomfield Hills; Amitabh B. Ghosh, Madison Heights, both of Mich.

[73] Assignee: American Laboratories, Madison Heights, Mich.; a part interest

[21] Appl. No.: 183,126

[22] Filed: Jan. 18, 1994

Related U.S. Application Data

[63] Continuation of Ser. No. 806,120, Dec. 12, 1991, abandoned.

[51] Int. Cl.$^6$ .................................................. C02F 9/00
[52] U.S. Cl. .................... 210/668; 210/673; 210/681; 210/903
[58] Field of Search .................................. 210/668, 673, 210/681, 284, 903

[56] References Cited

U.S. PATENT DOCUMENTS

| | | | |
|---|---|---|---|
| 3,723,308 | 3/1973 | Breck | 210/681 |
| 4,522,727 | 6/1985 | Weber | 210/681 |
| 4,695,387 | 9/1987 | Berry et al. | 210/681 |
| 4,717,483 | 1/1988 | Bush et al. | 210/681 |

*Primary Examiner*—Ivars Cintins
*Attorney, Agent, or Firm*—Basile and Hanlon

[57] ABSTRACT

A method for removing trace amounts of ammonia and ammonia-containing compounds from process water involving the destruction of the ammonia by oxidative procedures which includes the steps of:

concentrating ammonia and ammonium ions removed from the process water stream into contact with a suitable catalytic-adsorbent material contained in a plurality of discrete reaction vessels; and contacting at least one of the reaction vessels and the catalytic-adsorbent contained therein with an alkaline oxidative solution capable of converting the concentrated ammonia and ammonium ions to simple environmentally neutral compounds.

15 Claims, 1 Drawing Sheet

PROCESS FOR REMOVING TRACE AMOUNTS OF AMMONIA-CONTAINING COMPOUNDS FROM AQUEOUS STREAMS

This application is a continuation of application Ser. No. 07/806,120, filed on Dec. 12, 1991, now abandoned.

BACKGROUND OF THE INVENTION

I. Field of the Invention

The present invention relates to a process and apparatus for removing ammonia-containing compounds from aqueous fluids and process streams such as water. More particularly, the present invention relates to a process and apparatus whereby contaminated water is successfully treated to remove ammonia-containing compounds. Even more particularly, the present invention provides a process and apparatus which permits the chemical treatment of ammonia-containing compounds so removed to yield environmentally neutral reaction products.

II. Description of the Prior Art

As a result of growing concern for the purity of water resources and, in response to growing governmental pressures to maintain the quality of these water resources, industry and other large-scale water consumers have been required to investigate and implement methods for reducing various chemical pollutants discharged in their effluent streams. Ammonia-containing compounds are employed in a variety of manufacturing processes such as the production of zeolite catalysts. In the manufacture of such cracking catalysts, sodium ions are removed by washing the catalytic material with a solution containing ammonium sulphate. This process results in large volumes of waste water which are contaminated with various salts including ammonium sulphate.

Various methods have been proposed, discussed and employed to remove ammonia-containing contaminants such as ammonium sulphate from effluent stream. The most common methods employ aqueous sodium hydroxide to raise pH of the effluent stream to a level above 9. At this pH level, gaseous ammonia is liberated from the aqueous stream and can be vented or recovered as required. This process generally removes gross amounts of ammonia. However large concentrations of ammonia-containing compounds can still remain in the effluent stream.

In recent years, ammonia recovery has become an environmental necessity. Growing concern for water and air quality have resulted in stricter governmentally enforced standards regarding the manner and quantity of the ammonia discharge. It is anticipated that in the near future, governmental agencies such as the United States Environmental Protection Agency will require water discharge streams to contain no more than 10 ppm, or that amount which will permit the survival of 3 out of 5 minnows in water containing the ammonia or ammonia-containing compounds.

A variety of recovery systems have been employed in an effort to comply with governmental mandates regarding environmental pollution. In recent years, the cost of raw materials necessary to implement such recovery has risen sharply. While this adversely affects the economic viability of such ammonia recovery processes, increasing environmental concerns make it imperative that ammonia and ammonia-containing compounds be removed from waste water steams even at extraordinarily high economic costs. These high economic costs will, necessarily, be passed back to consumers of products which require the generation of waste ammonia or ammonia-containing contaminants. This will make such domestic processes non-competitive with processes occurring in countries which disregard the adverse impact of pollution on their respective local environments. Consequently, a variety of alternative processes have been proposed.

One example of ammonia-recovery processes is disclosed in U.S. Pat. No. 1,266,147 to Ore. The Ore process employs lime in the recovery of ammonia from cold distillation streams. In the Ore process, lime is added to the process water containing ammonia at temperatures between about 44° C. and about 70° C. to liberate ammonia in gaseous form. The Ore process makes no provision for the efficient collection of generated ammonia and is silent on a method for removing the final trace amounts of ammonia present after gaseous liberation.

U.S. Pat. No. 4,093,544 to Ross describes a method and apparatus for removing ammonia and other nitrogen containing compounds from waste water by increasing the pH of the water with an alkaline agent such as lime. The Ross reference creates additional pollution problems in that it fails to address the problem of calcium contamination in the process stream.

A number of ammonia removal processes have been proposed which involve aqueous distillation procedures. In such procedures, a caustic material such as lime is added to the process stream to raise the pH during distillation. The resulting water vapor and gaseous ammonia evolved during distillation are removed while the unwanted calcium-salts remain in the distillation chamber. Theoretically only small amounts of the calcium salts are carried with the distilled material to subsequent ammonia stripping chambers. Such processes are extremely energy intensive and do not address problems related to removal of dissolved solids which result from such procedures and the disposal of materials such as lime added during the various processes to facilitate ammonia removal. Some examples of these processes include U.S. Pat. Nos. 1,936,864 and 1,983,320 to Spur, Jr.; U.S. Pat. No. 2,018,863 to Miller; and U.S. Pat. No. 4,140,131 to Didycz et al.

None of the processes discussed addresses the difficulties encountered in removing the final trace amounts of ammonia remaining in an effluent stream after ammonia stripping or other waste water treatment. Trace amounts of ammonia or ammonia-containing compounds in aqueous effluent as low as 10 ppm have been found to have deleterious effects on the ecosystems of lakes and streams to which they are discharged. In recognition of this the US EPA has issued more stringent restrictions on the ammonia content of aqueous effluent to the result that discharge streams be capable of supporting aquatic life so that no more than two minnows out of five die when exposed to the discharge water. To meet these stricter standards, it is becoming necessary that discharge water streams be rendered essentially ammonia-free; a standard impossible to reach by employing water treatment processes such as those outlined previously.

Thus, it would be desirable to provide a process for reducing ammonia and ammonia-containing compounds in waste water to levels at or below those mandated by the appropriate environmental protection authorities which are fully capable of supporting and maintaining aquatic life. It is also desirable that this process and apparatus be an integrated self-contained system which would efficiently isolate and recover substantially all ammonia and ammonia-containing compounds removed during the water treatment process. It is also desirable that the process yield compounds which are subsequently useful or present in an environmentally neutral form. It is also desirable that the process and apparatus of the present invention be capable of continuous use as required. It is also desirable that the process provide the ability to regenerate any catalyst or purification compounds in situ without interfering with ongoing water purification.

SUMMARY OF THE INVENTION

There is disclosed herein a novel process and apparatus for reducing and/or eliminating the concentration of ammonia-containing compounds in water which involves the systematic oxidation of these ammonia-containing compounds to simple compounds such as nitrogen and water. In the process of the present invention ammonia-containing compounds are removed from the water stream and concentrated on a suitable activated adsorbent-catalyst material. The activated adsorbent-catalyst material employed is one which will suitably concentrate the ammonia-containing compounds from large volumes of water with which it is brought in contact to a confined area and permit subsequent chemical decomposition of the resulting concentrated compounds.

The amount of ammonia-containing compounds removed from the process stream can be varied depending upon factors such as contact time and total exposure to amounts of fresh catalyst. It is theoretically possible to achieve complete removal of all detectable quantities of ammonia-containing compounds from the treated water.

In the process of the present invention, when a defined amount of activated catalyst has reached a specified contamination level, it can be regenerated to restore its ability to remove additional amounts of ammonia-containing compounds from the water stream. In the preferred embodiment the defined amount of activated catalyst is contacted by a suitable regeneration material which is capable of dissociating the ammonia-containing compounds from contact with the catalyst in an environmentally safe manner. The regenerating material employed is preferably an aqueous material capable of oxidizing the removed ammonia-containing compounds to simple compounds such as nitrogen and water. Contact is maintained for a sufficient interval to permit oxidation; after which the regenerated catalyst may be brought into contact with additional amounts of water to be purified.

The apparatus of the present invention comprises at least one reaction vessel capable of containing the catalyst material therein in a manner which facilitates intimate contact between the contained catalyst material and a waste water stream introduced thereto. The apparatus of the present invention also includes means for conveying the waste water stream to and from the reaction vessel as well as conduits and receptacles for holding appropriate regeneration materials and conveying these to the reaction vessel as required, and a means to remove suspended solids carried by the waste water stream such as a sand filter or other appropriate means for filtration to protect the catalyst from contamination by solid particles.

BRIEF DESCRIPTION OF THE DRAWING

In the present description, reference is made to the following drawing in which.

DESCRIPTION OF THE PREFERRED EMBODIMENT

Figure 1:
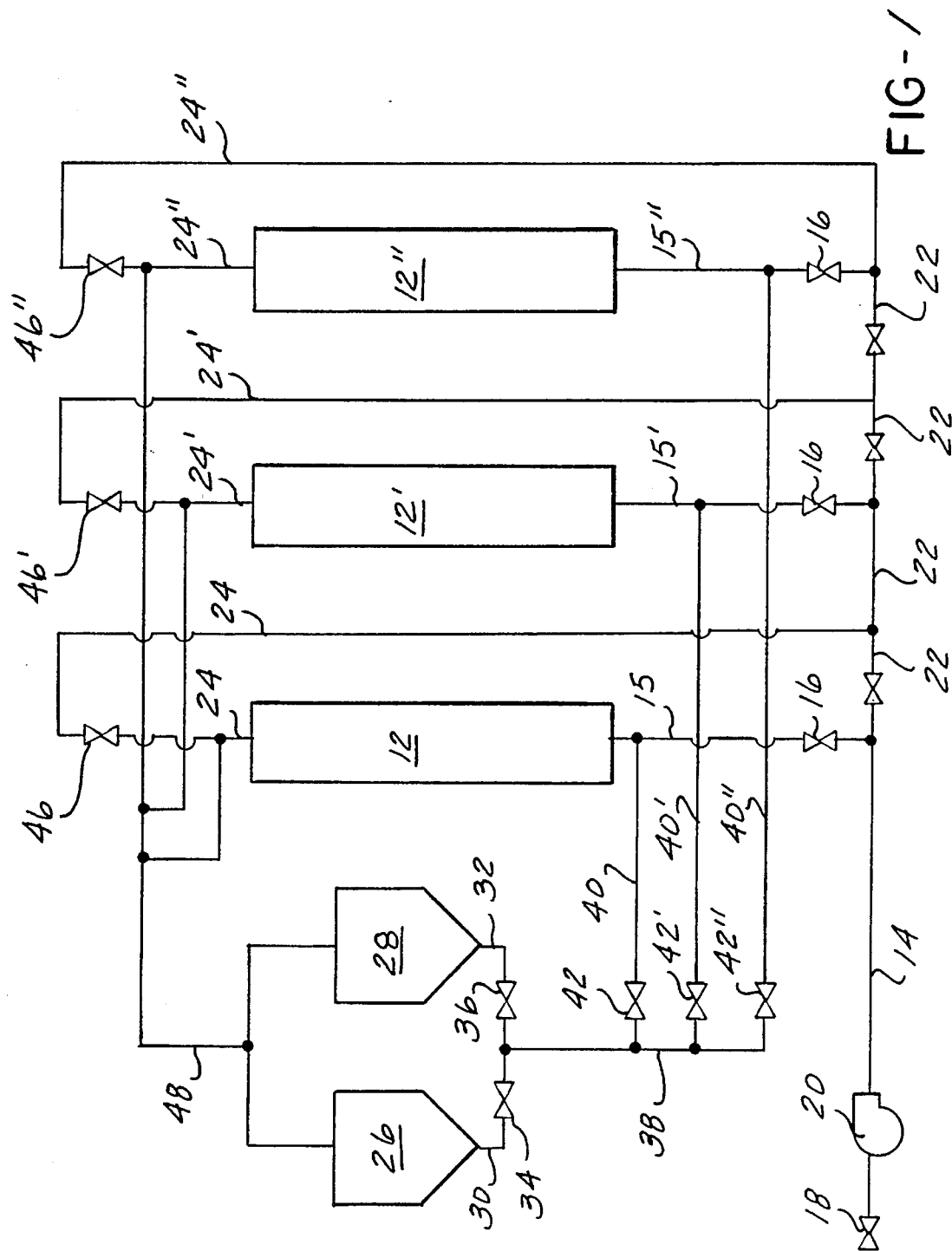
FIG. 1 is a schematic representation of the device of the present invention.

The present invention is predicated upon the unexpected discovery that certain catalyst materials exhibit adsorptive-catalytic properties such that they can be employed to successfully remove ammonia-containing compounds from process water streams. The ammonia-containing compounds thus treatable are generally those ammonia-containing compounds dissolved or solubilized in the water stream. These are generally present as either ammonia ($NH_3$) or, more commonly, ionic ammonia ($NH_4^+$).

The catalyst material employed in the present invention is capable of isolating ammonia-containing compounds from the waste water stream and concentrating them to obtain concentration levels which render the ammonia-containing compounds chemical decomposition occurring on or near the catalytic-adsorbent which converts the concentrated ammonia-containing compounds to environmentally neutral compounds such as nitrogen and water.

THE APPARATUS

The apparatus of the present invention is a device capable of removing trace amounts of ammonia-containing compounds from a process waste water stream. The apparatus of the present invention includes a plurality of reactors 12, 12', 12" which contain a suitable catalytic-adsorptive material. The reaction vessels 12, 12', 12" may have any suitable closed or opened configuration. Optionally one or more of the vessels may be pressure-rated or pressure-resistant, if desired.

The apparatus of the present invention also includes a suitable water conveying conduit 14 to convey waste water to be treated from a suitable collection source or prior treatment operation into the initial reaction vessel 12.

The water collection source may be any suitable reservoir or upstream processing or generation facility (not shown) capable of providing a suitably steady stream of water to be treated. The water thus collected will generally contain trace amounts of ammonia-containing compounds. As employed herein the term "trace amount" is generally defined as a concentration of ammonia-containing compounds lower than that generally removable by conventional ammonia stripping methods. This concentration is generally at or below the solubility value ($K_a$) of ammonia. At 25° C. this concentration is between about 50 and about 100 ppm. Thus upstream processing facilities can be those capable of reducing the concentration of ammonia-containing compounds to trace levels.

In the preferred embodiment, water to be treated, is conveyed from the water collection source sequentially through at least three separate reaction vessels 12, 12', 12" connected to water conveying conduit 14 by conduits 15. Each reaction vessel 12, 12', 12" may be temporarily isolated from contact with the waste water stream by suitable valves located in the conduits 15 such as values 16.

Located in the conduit 14 is a valve 18 for controlling the flow of water from the process waste stream source into the apparatus. The conduit 14 may also have at least one pump 20 to assist in conveying water through the apparatus. Also located in the conduit 14 are a series of valves 22, which can be opened and closed to assist in the direction of water through the chosen reactors 12.

It is to be understood that the apparatus of the present invention may have one or any number of reactors 12. Two or more reactors are desirable to permit regeneration of the catalytic adsorptive material and maintain reaction efficiency. A plurality of reactors 12 permits regeneration to be carried on in at least one reactor while removal of ammonia-containing compounds can proceed in those reactors 12 remaining on stream. In the preferred embodiment, at least three reactors are connected to water conduit 14 in a manner which permits the process stream to pass sequentially through any combination of reactors 12.

The reactors 12 can contain any suitable catalytic-adsorbent material capable of removing dissolved ammonia-containing compounds from the waste water stream to a confined area. The term "adsorbent-catalyst" as employed herein is defined as a solid, preferably porous, material or materials to which ammonia containing compounds are physically, physicochemically or chemically attracted and is essentially impervious to oxidative materials and processes. Suitable materials can include, but are not limited to, ion exchange resins, solid catalysts, and traditional adsorptive materials. Suitable adsorbent-catalyst materials can include materials selected from the group commonly consisting of activated alumina, silica, silica-alumina and mixtures thereof. Supported materials may also include Group VIII B metals, Group I B metals, and mixtures thereof. In the preferred embodiment, activated alumina is employed. Various ion exchange resins may also be employed in addition to or as an alternative to activated alumina, silica, or silica-alumina in the present invention. The ion exchange resin employed may be either an ionic, anionic or amphoteric materials which are commercially available from a variety of sources.

Without being bound to any theory, it is believed that the removal of ammonia-containing compounds from the waste water stream and its concentration on or near the adsorbent-catalyst is the result of either adsorption, mass transfer, or a combination of the two. Thus, other adsorbent-catalysts may be employed which can cause mass transfer and/or adsorption of ammonia-containing compounds from the waste water stream.

The adsorbent-catalyst material may be used in any of a variety of physical forms provided the material permits adequate contact area between the catalytic adsorbent and the process water. Thus the adsorbent-catalyst material may be used in the form of pellets, cylindrical honeycomb monoliths, crushed fragments, random particles or any other desired form. Pellets of adsorptive material having diameters between about 1 mm and about 5 mm can be successfully employed. The adsorbent-catalyst material can be prepared by a number of conventional methods or can be obtained commercially from a variety of suppliers such as W.R. Grace and Company.

In the preferred embodiment, reactors 12, 12', 12" each contain an identical or compatible adsorbent-catalyst material. The adsorbent-catalyst material can be housed and packed in any manner and amount which will provide sufficient contact time to effect removal of the ammonia-containing compounds from the process water stream. In the preferred embodiment, the pellet material is loosely packed in a manner which permits efficient contact between the passing process water stream and the adsorbent-catalyst material while preventing unnecessary agitation of the same.

The apparatus 10 of the present invention also has a plurality of exit conduits 24, 24', 24" each in fluid contact with a respective reactor 12, 12', 12" for conveying the water stream from the given reaction vessel back to the water conveying conduit 14 and on the next on line reaction vessel.

The apparatus 10 also includes means for selectively isolating a given reactor from contact with the waste water stream and regenerating contaminated adsorbent-catalyst material contained therein. The regeneration means preferably includes a holding device for retaining suitable regeneration material until required and suitable devices for conveying a suitable portion of the retained regeneration material from the holding device to the isolated reactor.

In the preferred embodiment, the holding device includes at least two containment reservoirs: a holding tank 26 for containing alkaline regeneration material and a holding tank 28 for containing an oxidizing solution. The holding tanks 26, 28 can be constructed in any conventional manner and from any conventional materials. The holding tanks 26, 28 are connected to a pair of collector lines 30, 32 having shut-off valves 34, 36 respectively. These connect the holding tanks 26, 28 to a regeneration material conveying line 38 which can be equipped with at least one pump (not shown) to convey regeneration materials into the selected diverter lines 15, 15', 15" and into the isolated reactor In the preferred embodiment, regeneration materials are conveyed from regeneration line 38 to the appropriate diverter line 15, 15', 15" via an associated regeneration connector line 40, 40', 40" Each regeneration connector line 40, 40', 40" is equipped with a suitable closure valve 42, 42', 42" to control entry of the material into the selected diverter line 15, 15', 15"

The regeneration materials are preferably present in suitable aqueous solutions which can be readily conveyed through the appropriate conduits into the bottom of the isolated reactor, into contact with the catalytic-adsorbent and exit through associated exit conduit 24, 24', 24" Spent regeneration material conduits 44, 44', 44", are connected to the associated exit conduit 24, 24', 24" at a point immediately upstream of shutoff valve 46, 46', 46". When closed shut off valve 46, 46', 46" diverts the regeneration material from down stream portions of the associated exit conduit 24, 24', 24" into a removal line 48 for conveyance back to the holding device for reuse or to a suitable spent regeneration material collection device (not shown) for disposal.

In this manner, regeneration materials can be conveyed to a given reactor 12, 12', 12", once that reactor has been isolated from the process waste stream passing through conduit 14.

The reactor 12, 12', 12" can also be equipped with a suitable venting means (not shown) to permit the escape of any gaseous material such as nitrogen which is evolved during the regeneration process.

The apparatus 10 may also be equipped with an alternate regeneration means which includes a suitable heating jacket associated with each reactor 12, 12', 12" to raise the temperature of the isolated adsorbent-catalyst contained in the reactor to a level which oxidizes the ammonia-containing compounds contained on the adsorbent-catalyst.

The apparatus 10 for reducing or eliminating ammonia-containing compounds in process waste water using a adsorbent-catalyst can include suitable means for regulating and/or elevating the pressure and/or temperature at which the removal process is carried out (not shown).

THE PROCESS

The process of the present invention involves the removal of ammonia-containing contaminants from a process waste water stream and the conversion of such materials to environmentally neutral compounds such as nitrogen and water. In describing the process of the present invention, reference is again made to the apparatus 10 shown in FIG. 1.

In the method of the present invention, an aqueous fluid such as process waste water stream containing ammonia and/or ammonia-containing constituents is brought in contact with a chosen adsorbent-catalyst material for an interval sufficient to remove a major portion of the ammonia-containing compounds from the process stream. As indicated previously, the adsorbent-catalyst material may be any material capable of accomplishing isolation and removal of ammonia-containing compounds contained in waste water streams particularly after conventional ammonia stripping operations. Without being bound to any theory, it is believed that the adsorbent-catalyst employed in the present invention effects a selective isolation of ammonia-containing compounds from the process waste water stream to a location on or near the surface of the adsorbent-catalyst either by physical adsorption of the compounds into the pores of the adsorbent-catalyst or by a mass transfer phenomenon involving the compounds and the adsorbent catalyst or a combination of both.

In the preferred embodiment, the adsorbent-catalyst material is contained in a series of discrete reactors such as reactors 12, 12', 12" which are sequentially arranged such that the process water passes from first reactor 12 to second reactor 12' to third reactor 12" and so forth in a manner such that incremental amounts of the total ammonia concentration are removed with each pass. Thus, the efficiency of the total removal process is affected not just by the total contact time between the process stream and the adsorptive material but also by recurring contact with fresh, relatively uncontaminated adsorptive material.

As can be appreciated by one skilled in the art, process streams containing greater concentrations of ammonia-containing compounds would require greater exposure to a greater number of reaction beds, or a longer contact time with the adsorptive catalyst. Similarly, incremental removal of the final trace amounts of the ammonia-containing compound can best be accomplished in final polishing phases in which the previously treated process stream is contacted with a final relatively non-contaminated adsorptive bed.

The waste water thus treated can result in removal of ammonia-containing compounds to levels below detection limits of conventional instrumental analysis (i.e. less than 0.017 ppm). In the method of the present invention, the process waste water is maintained in contact with the catalytic-adsorptive material for an interval sufficient to effect removal of a major portion of the ammonia-containing compounds from the process stream. In the preferred embodiment the process waste water is fed through conduit 22 to connector conduit 15 to the bottom of reaction vessel 12 at a predetermined flow rate which may be varied by valve 18 and pump 20 or other conventional metering means to yield a total contact time sufficient to reduce the ammonia content of the water stream to the desired limit. Normally a contact time of 5 to 120 minutes is sufficient to produce the desired results, depending on the concentration of the ammonia in the input water stream.

Removal of the ammonia-containing compounds from the process waste water stream accomplishes the concentration of ammonia-containing compounds on the catalyst-adsorbent by mass transfer action. This renders the removed ammonia and ammonia-containing compounds amenable to subsequent or simultaneous conversion of the ammonia compounds to simpler, environmentally neutral reaction products. Such conversion results in the regeneration of the catalyst-adsorbent; permitting it to be reused for subsequent waste water purification.

REGENERATION

Once the capacity of a defined amount of adsorbent-catalyst material such as that contained in a specific reaction vessel has been achieved, the adsorbent-catalyst material can be isolated from further contact with the process water. The isolated adsorbent-catalyst material is, then, treated in a manner to destroy the ammonia-containing compounds concentrated thereon.

In the preferred embodiment, the isolated adsorbent-catalyst material is brought into contact with suitable compounds which react with the ammonia-containing compounds concentrated on the material to convert these compounds to environmentally neutral or environmentally beneficial forms.

In the preferred embodiment, the isolated adsorbent-catalyst material is contacted by a regeneration material which includes a suitable oxidizing reagent and a caustic. Without being bound by any theory, it is believed that increases in the alkalinity of the surrounding aqueous environment caused by the caustic effects the reactivity of the ammonia-containing compounds and ensures that the ammonia-containing compounds are converted from ammonium ions ($NH_4^+$) to ammonia ($NH_3$). Volatilization of ammonia is not considered a problem as studies indicated that there is no relationship between pH and the amount of ammonia volatilized at low concentrations. At low concentrations, ammonia remains dissolved in an equilibrium between ammonia ($NH_3$) and ammonium ions ($NH_4^\oplus$) which can be expressed at 25° C. by the equations:

I. $\quad NH_4^+ + OH^- \longleftrightarrow NH_3 + H_2O$

II. $\quad K_a = \dfrac{[NH_4^+][OH^-]}{[NH_4^+]}$

Thus as the hydroxide ion concentration increases, so does the ammonia concentration; rendering the ammonia amenable to reaction with a suitable oxidizing agent such as hypochlorite ions according to the equation:

$$2NH_3 + 3\,OCl^{2-} \rightarrow N_2 + 3Cl^- + 3H_2O \qquad \text{III.}$$

In the preferred embodiment, the pH of the aqueous solution surrounding the adsorbent-catalyst material is raised to a level sufficient to raise the concentration of ammonia-containing compounds existing as $NH_3$; above about 9.5 and, preferably, above about 11.0. This can be accomplished by the addition of any suitable alkaline material to the reaction vessel 12. It is preferred that the alkaline material be an aqueous fluid containing between about 0.05 and about 10.0% by weight caustic material. The caustic employed is preferably an inorganic material which is readily soluble in water and is capable of forming reaction products which remain essentially soluble therein. Such materials include alkali metal hydroxides and silicates such as sodium hydroxide, sodium silicate or the like. A variety of other caustic solutions can be obtained and successfully employed as the alkalinity agent in the present invention given the disclosure provided herein In order to decompose the previously isolated ammonia, the adsorbent-catalyst material is also contacted with a suitable oxidizing agent in sufficient quantities to convert the isolated ammonia to nitrogen, water and environmentally neutral salts according to Equation III.

The oxidizing agent employed in the present invention is, preferably, an inorganic material selected from the group consisting of permanganic acid, alkali metal salts of permanganic acid, hypochlorous acid, alkali metal salts of hypochlorous acid, chloric acid, alkali metal salts of chloric acid, perboric acid, alkali metal salts of perboric acid, persulfuric acid, alkali metal salts of persulfuric acid, monopersulfuric acid, alkali metal salts of monopersulfuric acid, perchloric acid, alkali metal salts of perchloric acid, periodic acid, alkyl metal salts of periodic acid, hydrogen peroxide and mixtures thereof.

The oxidizing agent may be present in any form which is suitably soluble in water and which will react to form suitably soluble reaction products. The oxidizing agent is preferably present as the alkali metal salt of one of the previously enumerated acids with the alkali metal being selected from the group consisting of sodium, potassium, calcium, and mixtures thereof. The oxidizing agent is, preferably, present in an aqueous solution at a concentration sufficient to provide excess oxidizing agent for the oxidation of the isolated ammonia. In the process of the present invention, the oxidizing agent can be introduced into contact with the adsorptive bed simultaneously with or immediately after the introduction of the alkaline material. In the preferred embodiment, sodium hypochlorite is employed to achieve the following reaction:

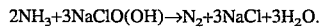

$$2NH_3 + 3NaClO(OH) \rightarrow N_2 + 3NaCl + 3H_2O. \qquad IV.$$

In the preferred embodiment, the aqueous regeneration solution contains between about 0.05 and about 10.0% by volume sodium hypochlorite. The two regeneration materials are kept in contact with the catalytic-adsorbent for an interval sufficient to oxidize major portions of the isolated ammonia. In the preferred embodiment, it is theorized that the capacity of a given reaction bed would be achieved in about 10 minutes to 5 hours with regeneration cycles occurring after these intervals and lasting for an interval between about 5 minutes and 1.5 hours.

Both the isolation and regeneration steps can occur at standard temperature and pressure. However, it is within the purview of this invention for the process to occur at elevated temperature and/or pressure. Elevation of temperature or pressure can accelerate the processes of the present invention; particularly the regeneration process as outlined above. The temperature preferably is maintained between ambient and the boiling point of the aqueous solutions while the pressure can be between atmospheric and 50 psi.

Regeneration is deemed complete when sufficient quantities of the isolated ammonia has been destroyed. At that time, the treated reactor can be brought back into contact with process waste water to continue the removal process. The catalytic-adsorbent material may be optionally rinsed prior to being brought back into contact with the process stream to remove any residual oxidizing material remaining thereon. Rinsing is not required however, as any oxidizing agent left on the surface of the material can be used in destroying more isolated ammonia during subsequent contact with the waste water stream.

The gaseous nitrogen generated as a result of the regeneration process of the present invention may remain dissolved in the process stream, be vented to the atmosphere or collected for reuse in other processes. The regeneration solution may be returned to the regeneration holding tank for replenishment and reuse. Alternately the pH of the solution may be adjusted and discharged as aqueous effluent.

Where advantageous, the adsorbent-catalyst material can, optionally, be exposed to an ammonia desorption process either as part of the regeneration cycle or at suitable intervals throughout the water treatment process. In this desorption process, the adsorbent-catalyst material to be regenerated is contacted by suitable rinse water which initiates the migration of the ammonia-containing compounds from the catalytic-adsorptive material into solution. The rinse water is, then, removed to a suitable processing area where the appropriate alkaline and oxidizing solutions are added to destroy the desorbed material. The desorption process can occur at ambient pressures or may occur and be accelerated by exposure to pressures up to about 50 psi. The desorption step can occur periodically or at suitable intervals to prolong duration between complete regeneration cycles.

As an augmental step in the water treatment process of the present invention, recovery of ammonia isolated on the adsorbent-catalyst material is possible by contacting the adsorbent-catalyst with an acidic solution having a pH low enough to reduce the aqueous solubility of ammonia ($NH_3$) concentrated on the catalytic adsorbent. The ammonia thus generated can be collected for recycle and reuse. If desired, the adsorbent-catalyst can be exposed to the regeneration procedure outlined above, exposed to elevated oxidative temperatures, or can be brought back into contact with the waste water stream depending upon the degree of contamination, regeneration, etc.

Where acidic desorption is employed, the acidic solution preferably contains between about 0.05% and about 10.0% by volume acid. The acid employed is, preferably, an inorganic acid selected from the group consisting of sulfuric acid, hydrochloric acid, phosphoric acid, and mixtures thereof. It is to be understood that other suitable organic or inorganic acids may be employed within the purview of this invention.

For a more complete understanding of the present invention, reference is made to the following examples. These examples are to construed as illustrative and not limitative of the present invention.

EXAMPLE I

Destruction of ammonia was achieved in the laboratory by the following process. A 500 ml sample of water was spiked with 28 milligrams of ammonia (56 ppm). Sufficient sodium hydroxide was added to adjust the solution pH to 11.5 thereby ensuring that all ammonium ions ($NH_4^+$) were converted to ammonia, ($NH_3$).

Calcium hypochlorite ($Ca(OCl)_2$) was added incrementally to the solution and the ammonia concentration electronically monitored. It was found that 365.8 milligrams of calcium hypochlorite was required to destroy 28 milligrams ammonia at a pH of 11.5.

EXAMPLE II

The procedure of Example I was repeated with sodium hypochlorite being substituted for calcium hypochlorite. It was found that the addition of 614 milligrams sodium hypochlorite was required to destroy 56 ppm ammonia at a pH of 11.2.

EXAMPLE III

The effect of sodium silicate on the ammonia destruction procedure was determined by employing the procedure outlined in Example I with the substitution of sodium silicate for sodium hydroxide to raise the solution pH to 12.0. Calcium hypochlorite was added to the sample and the ammonia concentration electronically measured at 30 minute intervals. It was found that the addition of 189 milligrams of calcium hypochlorite reduced the ammonia concentration to less than 0.9 ppm.

Further experiments were conducted to determine the effect of increased concentrations of sodium silicate on the rate of oxidation. The results of these experiments are summarized in Table I. Additional tests were conducted to determine the effect of high concentrations of sodium hypochlorite on oxidation rates. As shown in Table II, complete decomposition of ammonia was found to occur rapidly under high sodium hypochlorite concentrations.

EXAMPLE IV

The ammonia removal and decomposition process of the present invention was tested using a pilot plant consisting of 3 separate reactors each 4 ft. tall having a 4 inch diameter. The initial catalyst employed in the reactors was an activated alumina substrate supporting rare earths commercially available from W. R. Grace & Co.

Waste water was prepared having an initial ammonia concentration of 46 ppm and a pH of 7.8 and was introduced through the reactors at a flow rate of 110 ml/minute to yield a 30 minute contact with a reactor. The pH and ammonia concentration of the effluent was analyzed at various intervals. After 120 minutes the composite sample of effluent was found to have a pH of 8.4 and contain 7.1 ppm $NH_3$. The total amount of ammonia removed from solution was found to be 279.4 milligrams.

The results of this test are summarized in Table III.

EXAMPLE V

The catalytic adsorptive material of Example III was regenerated by pumping a 1% $H_2SO_4$ solution into the reactor and maintaining it in contact with the catalytic adsorbent material for 30 minutes at 22 psi. Total ammonia recovered was 28.99 milligrams.

EXAMPLE VI

The effects of various pressure levels on ammonia recovery from catalytic adsorbent material was determined by employing the process outlined in Example V at 30 and 50 psi respectively. The ammonia concentration of the resulting regenerant was measured. The results are summarized in Table IV. The total amount of ammonia recovered in this manner was 202.92 milligrams out of a total 279.4 milligrams adsorbed as a result of the procedure outlined in Example III.

EXAMPLE VII

The catalytic adsorptive material employed in Example III was, then, further regenerated by exposure to plain water at varying pressures. The results are summarized in Table V.

EXAMPLE VIII

After acid and water regeneration, the pilot plant outlined in Example III was brought on line to treat five gallons of water spiked to produce a uniform ammonia concentration of 43.0 ppm. The water to be treated was passed through the device at a flow rate of 110 ml/min and a pressure of 20 psi. The catalytic-adsorbent was maintained at 20 psi for 20 minutes prior to introduction of the water to be treated.

After 72 minutes, the ammonia concentration for the composite was 9.1 ppm. Total ammonia input was 386 milligrams. Total ammonia output was 71 milligrams with total ammonia adsorption being 315.4 milligrams.

During treatment, the water effluent was sampled periodically to determine purification effectiveness. The results are summarized in Table VI.

EXAMPLE IX

After processing the water as outlined in Example VIII, the catalytic-adsorbent was regenerated in the manner outlined in Table VII. It was found that a solution containing 1% caustic and sodium hypochlorite was most effective in destroying adsorbed ammonia.

EXAMPLE X

The reactor outlined in Example III was packed with activated alumina, spherical shape commercially available from Daniel L. Bowers Co. Actual process waste water was obtained having an initial pH of 8.0 and an initial ammonia concentration of 48.2 ppm. The material was introduced into the reactor at a flow rate of 110 ml/min. Samples of the treated effluent were taken at intervals to determine process efficiency. The results are outlined in Table VIII.

Composite samples were also taken and measured after 120 minutes. The composite sample had a pH of 8.95 and an ammonia concentration of 0.28 ppm. At 315 minutes, the next composite sample had a pH of 8.95 and an ammonia concentration of 4.14 ppm. At 530 minutes the next composite sample had a pH of 9.0 and an ammonia concentration of 12.83 ppm. A final composite sample was taken at 735 minutes and had a pH of 9.2 and an ammonia concentration of 62.18 ppm.

TABLE I

Effect of various caustic concentration levels on ammonia decomposition rates.

| Oxidant 10% NaOCl (ml) | Caustic Sodium Silicate (ppm) | Solution pH | $[NH_3]_{30}$ |
|---|---|---|---|
| 0.9 | 10.0 | 11.91 | 43.6 |
| 2.0 | 20.0 | 11.90 | 15.5 |
| 3.0 | 30.0 | 11.95 | 2.7 |
| 4.0 | 40.0 | 11.86 | <0.1 |

TABLE II

Effect of various concentrations of oxidizing agent (sodium hypochlorite) on ammonia decomposition rates.

| $N_aOCl$ (ml) | pH | $[NH_3]_{30}$ | $[NH_3]_{60}$ | $[NH_3]_{100}$ |
|---|---|---|---|---|
| 0.3 | 12.3 | 42.0 | 36.0 | 31.3 |
| 0.6 | 12.3 | 26.7 | 25.5 | 26.0 |
| 0.9 | 12.3 | 28.0 | 28.0 | 23.7 |
| 2.0 | 12.3 | 12.5 | 10.7 | 10.0 |
| 4.0 | 12.3 | <0.3 | <0.3 | <0.3 |

TABLE III

Removal of ammonia using catalytic adsorbent material.

| Time (minutes) | pH | $[NH_3]$ (ppm) |
|---|---|---|
| 33.4 | 7.7 | 0.03 |
| 60.0 | 8.3 | 0.04 |
| 90.0 | 8.3 | 0.9 |
| 110.0 | 8.3 | 5.8 |
| 150.0 | 8.3 | 19.9 |
| 170.0 | 8.4 | 25.5 |

TABLE IV

Effect of elevated pressure on ammonia recovery.

| Volume 1% $H_2SO_4$ (liters) | Pressure (psi) | Time (minutes) | pH | $[NH_3]$ (ppm) |
|---|---|---|---|---|
| 3.8 | 22 | 30 | 5.0 | 28.99 |
| 3.8 | 30 | 30 | 4.1 | 14.8 |
| 3.8 | 50 | 30 | 2.3 | 4.8 |

TABLE V

Effect of plain water regeneration on catalytic adsorptive material.

| Regenerant | Pressure (psi) | Time (minutes) | pH | $[NH_3]$ |
|---|---|---|---|---|
| water | 22 | 12 | 3.8 | 0.4 |
| water | std | 10 | 3.0 | 3.9 |
| water | std | 20 | 3.0 | 3.9 |
| water | 50 | 22 | 4.1 | 2.1 |
| water | 32 | 53 | 4.1 | 2.1 |
| water | 22 | 54 | 4.1 | 3.5 |
| water & air | 20 | | 3.9 | 2.2 |

TABLE VI

Ammonia removal results for water running under 20 psi.

| Time (minutes) | pH | $[NH_3]$ |
|---|---|---|
| 20 | 3.7 | 4.7 |
| 40 | 3.8 | 4.9 |
| 50 | 3.9 | 9.3 |
| 60 | 3.9 | 14.1 |
| 70 | 4.0 | 21.3 |

TABLE VII

Regeneration results employing various regeneration media.

| Regeneration Media | Pressure (psi) | Time (minutes) | pH | $[NH_3]$ |
|---|---|---|---|---|
| plain water | — | — | 4.7 | 29.8 |
| plain water | 20 | 20 | 4.8 | 30.1 |
| 1% $N_aOCl$; caustic (first pass) | 20 | 30 | 4.2 | N/D |
| 1% $N_aOCl$, Caustic (second pass) | 30 | 30 | 6.5 | N/D |
| Reactor drained of last 100 ml | — | — | 10.8 | N/D |

TABLE VIII

Ammonia removal effectiveness of activated alumina material.

| Time (minutes) | pH | $[NH_3^+]$ |
|---|---|---|
| 30 | 9.4 | 0.1 |
| 60 | 9.1 | 0.4 |
| 90 | 8.8 | 0.5 |
| 120 | 8.8 | 0.2 |
| 160 | 8.9 | 0.7 |
| 180 | 8.8 | 0.7 |
| 200 | 8.9 | 1.8 |
| 240 | 8.9 | 2.5 |
| 280 | 8.8 | 4.9 |
| 300 | 8.8 | 8.3 |
| 330 | 8.8 | 11.5 |
| 360 | 8.9 | 14.4 |
| 400 | 9.1 | 10.9 |
| 440 | 9.1 | 17.21 |
| 460 | 9.1 | 14.30 |
| 500 | 9.1 | 22.0 |
| 550 | 9.1 | 19.3 |
| 585 | 9.2 | 25.0 |
| 600 | 9.2 | 25.2 |
| 660 | 9.2 | 30.3 |
| 700 | 9.2 | 43.82 |

What is claimed is:

1. A method for converting ammonia-containing materials in an aqueous process fluid to nitrogen and water such that the level of ammonia-containing materials are reduced to a level below about 0.017 ppm, the method comprising the steps of:

concentrating the ammonia-containing materials in a confined location by introducing the aqueous process fluid into a first reaction vessel containing an adsorbent-catalyst material having a porous surface, said adsorbent-catalyst material packed within said reaction vessel;

maintaining the aqueous process fluid in contact with said adsorbent-catalyst material for an interval sufficient to effect transfer of a major portion of the ammonia-containing materials from the aqueous fluid into concentrated contact with said porous surface of said adsorbent-catalyst material;

removing the aqueous fluid from said first reaction vessel after said major portion of ammonia-containing materials has been mass transferred to and concentrated on said adsorbent-catalyst material, said removed aqueous fluid containing a residual quantity of ammonia-containing materials;

introducing said removed aqueous fluid into at least one subsequent reaction vessel containing additional quantities of said adsorbent-catalyst material packed within said subsequent reaction vessel;

maintaining said removed aqueous fluid in contact with said additional quantities of adsorbent-catalyst material contained in said subsequent reaction vessel for an interval sufficient to effect mass transfer of a major portion of said residual quantity of ammonia-containing materials from said removed aqueous fluid into contact with said porous surface of said adsorbent-catalyst material;

contacting said adsorbent-catalyst material having said ammonia-containing materials concentrated thereon with an aqueous inorganic oxidizing agent, said aqueous inorganic oxidizing agent present in an amount sufficient to convert said ammonia-containing materials concentrated on said adsorbent-catalyst to nitrogen and water; and removing the aqueous fluid from said subsequent reaction vessel;

wherein said adsorbent-catalyst consists essentially of a solid, porous material which is essentially impervious to oxidative processes and to which aqueous-borne ammonia-containing materials are selectively attracted, said adsorbent-catalyst selected from the group consisting of activated alumina, Group VIII metals, Group IB metals and mixtures thereof.

2. The method of claim 1 wherein said adsorbent-catalyst material is activated alumina.

3. The method of claim 2 wherein the ammonia-containing materials are selected from the group consisting of ammonia, ammonium ions, and mixtures thereof, are removed from the aqueous fluid by mass transfer action and are concentrated on said adsorbent-catalyst material in a manner which permits subsequent chemical conversion of said concentrated ammonia-containing compounds into nitrogen and water.

4. The method of claim 3 further comprising the steps of:
   isolating at least one of said reaction vessels from contact with the aqueous fluid;
   contacting said adsorbent-catalyst material contained in said isolated reaction vessel with an aqueous oxidizing agent, said aqueous oxidizing agent present in an amount sufficient to decompose said ammonia-containing materials concentrated on said isolated adsorbent-catalyst to nitrogen and water; and
   maintaining remaining reaction vessels in contact with the aqueous fluid while said isolated adsorbent-catalyst is contacted with said aqueous oxidizing agent.

5. The method of claim 4 wherein said aqueous oxidizing agent consists essentially of an effective amount of an inorganic compound selected from the group consisting of permanganic acid, alkali metal salts of permanganic acid, hypochlorous acid, alkali metal salts of hypochlorous acid, chloric acid, alkali metal salts of chloric acid, perboric acid, alkali metal salts of perboric acid, persulfuric acid, alkali metal salts of persulfuric acid, monopersulfuric acid, alkali metal salts of monopersulfuric acid, perchloric acid, alkali metal salts of perchloric acid, periodic acid, alkali metal salts of periodic acid, hydrogen peroxide, and mixtures thereof and water.

6. The method of claim 5 wherein said inorganic compound is present in said aqueous oxidizing agent in an amount between about 0.05 and 10.0% by weight.

7. The method of claim 5 wherein said contacting step occurs at standard temperature and pressure.

8. The method of claim 5 wherein said contacting step occurs at a temperature less than the boiling point of the aqueous oxidizing agent and a pressure between standard atmospheric pressure and 50 psi.

9. The method of claim 4 wherein said adsorbent-catalyst material is contacted with an aqueous solution consisting essentially of an an alkali metal hydroxide and water, said alkali metal hydroxide present in an amount sufficient to raise the pH of the aqueous solution surrounding said adsorbent catalyst to greater than about 9.5, said contact occurring prior to introduction of said oxidizing agent.

10. The method of claim 1 wherein said ammonia-containing materials are initially present in the aqueous fluid in amounts less than the solubility value of ammonia at 25° C.

11. The method of claim 10 wherein said ammonia-containing materials are initially present in an amount less than about 100 ppm.

12. A method for converting ammonia and ammonium ions contained in a continuous aqueous process stream having an initial concentration of ammonia and ammonium ions less than the solubility value of ammonia at 25° C. to environmentally neutral components consisting essentially of nitrogen and water, the method comprising the steps of:

sequentially concentrating ammonia and ammonium ions removed from the continuous aqueous process stream onto an adsorbent-catalyst material with which the continuous aqueous process stream has been brought into contact, said adsorbent-catalyst material fixedly contained in a plurality of discrete reaction vessels in fluid serial contact with one another, said adsorbent-catalyst material selected from the group consisting of activated alumina, Group VIII metals, Group IB metals, and mixtures thereof;

sequentially isolating at least one discrete reaction vessel from contact with said continuous aqueous process stream while maintaining serial contact between the continuous aqueous process stream and said adsorbent-catalyst material contained in the remaining vessels, said isolation step occurring after said adsorbent-catalyst material contained in said discrete reaction vessel has reached an ammonia concentrating capacity;

contacting said isolated reaction vessel and said adsorbent-catalyst material contained therein with an alkaline solution capable of converting said concentrated ammonium ions to ammonia, said alkaline solution containing an inorganic caustic selected from the group consisting of alkali metal hydroxides, alkali metal silicates, and mixtures thereof and water, said inorganic caustic present in an amount sufficient to raise the pH of solution surrounding said adsorbent-catalyst material to a pH sufficient to convert a major portion of ammonium ions concentrated on said adsorbent-catalyst into ammonia; and contacting said adsorbent-catalyst material contained in said isolated reaction vessel with an aqueous oxidizing agent present in an amount sufficient to chemically convert said ammonia concentrated on said isolated adsorbent-catalyst to nitrogen and water, said oxidizing agent contacting step occurring after said adsorbent-catalyst has been contacted with said alkaline solution, said aqueous oxidizing agent consisting essentially of water and an inorganic material selected from the group consisting of sodium hypochlorite, calcium hypochlorite, potassium hypochlorite and mixtures thereof present in an amount between about 0.05% and about 10.0% by volume;

returning said isolated reaction vessel containing said adsorbent-catalyst material into contact with the continuous aqueous process stream after said adsorbed ammonia has been chemically converted to nitrogen and water.

13. The method of claim 12 wherein said adsorbent-catalyst material is activated alumina and said method occurs at standard temperature and pressure.

14. A method for converting ammonia-containing compounds contained in an aqueous process fluid to nitrogen and water, comprising the steps of:

concentrating ammonia-containing compounds initially present in the aqueous fluid in a concentration less than about 100 ppm in a confined location by introducing the aqueous process fluid into contact with activated alumina contained in a first reaction vessel;

maintaining the aqueous process fluid in contact with said activated alumina for an interval sufficient to concentrate a major portion of the ammonia-containing compounds onto said activated alumina;

removing the aqueous fluid from said first reaction vessel after said major portion of the ammonia-containing compounds have been concentrated on said activated alumina;

contacting said activated alumina in said first reaction vessel having said ammonia-containing compounds concentrated thereon with an aqueous oxidizing solution consisting of water and between 0.05 and 10.0% by weight of an inorganic compound selected from the group consisting of permanganic acid, alkali metal salts of permanganic acid, hypochlorous acid, alkali metal salts of hypochlorous acid, chloric acid, alkali metal salts of chloric acid, perboric acid, alkali metal salts of perboric acid, persulfuric acid, alkali metal salts of persulfuric acid, monopersulfuric acid, alkali metal salts of monopersulfuric acid, perchloric acid, alkali metal salts of perchloric acid, periodic acid, alkali metal salts of periodic acid, hydrogen peroxide, and mixtures thereof for an interval sufficient to convert said ammonia-containing compounds to nitrogen and water.

15. The method of claim 14 wherein said contacting step occurs at standard temperature and pressure.

* * * * *